(12) United States Patent
Gao et al.

(10) Patent No.: US 10,684,885 B2
(45) Date of Patent: *Jun. 16, 2020

(54) PORT MIRRORING IN A VIRTUALIZED COMPUTING ENVIRONMENT

(71) Applicant: Nicira, Inc., Palo Alto, CA (US)

(72) Inventors: Zhenyu Gao, Guangzhou (CN); Jingchun Jiang, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/401,114

(22) Filed: May 2, 2019

(65) Prior Publication Data
US 2019/0258505 A1   Aug. 22, 2019

Related U.S. Application Data

(63) Continuation of application No. 15/609,001, filed on May 30, 2017, now Pat. No. 10,296,370.

(51) Int. Cl.
G06F 9/455   (2018.01)
H04L 12/931   (2013.01)
H04L 12/46   (2006.01)

(52) U.S. Cl.
CPC ...... *G06F 9/45558* (2013.01); *H04L 12/4633* (2013.01); *H04L 12/4641* (2013.01); *H04L 49/208* (2013.01); *H04L 49/70* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 10,296,370 B2 * | 5/2019 | Gao | H04L 12/4633 |
| 2002/0054595 A1 * | 5/2002 | Ambe | H04L 12/46 370/390 |
| 2005/0114522 A1 * | 5/2005 | LaVigne | H04L 67/1095 709/228 |

(Continued)

OTHER PUBLICATIONS

Ed. J. Gross et al., "Geneve: Generic Network Virtualization Encapsulation Draft-Ietf-Nov3-Geneve-04", VMware Internet draft, Mar. 13, 2017, Expired on Sep. 14, 2017, pp. 1-26.

*Primary Examiner* — Jerry B Dennison
(74) *Attorney, Agent, or Firm* — Su IP Consulting

(57) ABSTRACT

A method for a hypervisor supported by a source host to implement a port mirroring session in a virtualized computing environment includes receiving a packet passing through a first virtual port supported by the source host, wherein the packet is destined for a destination virtual machine on a destination host. The method also includes based on a first media access control (MAC) address of a first virtual network interface controller (VNIC) associated with a first monitoring virtual machine (VM), obtaining a first IP address associated with a first host that supports the first VNIC and the first monitoring VM, generating a port mirroring packet with the first IP address and a mirrored copy of the packet, wherein the port mirroring packet comprises a first Generic Network Virtualization Encapsulation (Geneve) base header, which includes the first MAC address, and transmitting the port mirroring packet to the first host.

20 Claims, 7 Drawing Sheets

(56) References Cited

U.S. PATENT DOCUMENTS

| | | | |
|---|---|---|---|
| 2007/0110077 A1* | 5/2007 | Takashige | H04L 12/4675 370/395.53 |
| 2008/0281699 A1* | 11/2008 | Whitehead | G06Q 30/02 705/14.41 |
| 2014/0003249 A1* | 1/2014 | Cai | H04L 43/10 370/241 |
| 2014/0010096 A1* | 1/2014 | Kamble | H04L 49/354 370/252 |
| 2014/0098822 A1* | 4/2014 | Galles | H04L 49/208 370/412 |
| 2014/0280211 A1* | 9/2014 | Rash | G06F 40/30 707/748 |
| 2014/0280846 A1* | 9/2014 | Gourlay | H04L 41/00 709/223 |
| 2016/0182336 A1 | 6/2016 | Doctor et al. | |
| 2016/0380924 A1* | 12/2016 | Sivasankar | H04L 43/12 370/419 |
| 2017/0063661 A1* | 3/2017 | Claggett | H04L 43/10 |
| 2017/0180249 A1* | 6/2017 | Shen | H04L 45/586 |
| 2017/0180250 A1* | 6/2017 | Shen | G06F 9/45558 |
| 2018/0124139 A1* | 5/2018 | Jiang | H04L 65/4076 |
| 2018/0124171 A1* | 5/2018 | Han | H04L 43/0876 |
| 2018/0183756 A1* | 6/2018 | Bangalore Krishnamurthy | H04L 63/0227 |
| 2018/0241610 A1* | 8/2018 | Wang | H04L 41/0806 |
| 2018/0324061 A1* | 11/2018 | Khanal | H04L 43/04 |
| 2018/0331912 A1* | 11/2018 | Edmison | H04L 43/12 |
| 2018/0349163 A1 | 12/2018 | Gao et al. | |
| 2019/0056972 A1* | 2/2019 | Zhou | G06F 9/54 |

* cited by examiner

PORT MIRRORING IN A VIRTUALIZED COMPUTING ENVIRONMENT

CROSS-REFERENCE TO RELATED APPLICATION

This application is a continuation under 35 U.S.C. § 120 of U.S. patent application Ser. No. 15/609,001, filed May 30, 2017, which is incorporated by reference in its entirety.

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software -Defined Data Center (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc.

Port mirroring is a switch feature that may be configured between a pair of ports for the purpose of traffic monitoring, analysis, etc. During a port mirroring session, packets passing through a first port of the pair of ports are mirrored to form mirrored packets. The mirrored packets are then sent to a monitoring device coupled to a second port of the pair of ports. However, implementing port mirroring in a virtualized computing environment can be challenging.

For example, one known approach to implement port mirroring in a virtualized computing environment is to utilize Encapsulated Remote Switched Port Analyzer (ERSPAN) and Generic Routing Encapsulation (GRE). To set up a port mirroring session using ERSPAN and GRE, one requirement is to specify an Internet Protocol (IP) address associated with the second port, to which the monitoring device or virtual machine (VM) is connected. However, such an IP address may not be readily available at the time of setting up the port mirroring session in the virtualized computing environment. Suppose the monitoring device or VM migrates. The originally specified IP address may no longer be valid, and a different IP address will need to be specified for the port mirroring session. Suppose further that multiple monitoring devices or VMs are desired for port mirroring, so that multiple analysts can independently monitor or analyze the mirrored data. The IP address for each of these multiple monitoring devices or VMs needs to be specified.

DETAILED DESCRIPTION

Figure 1:
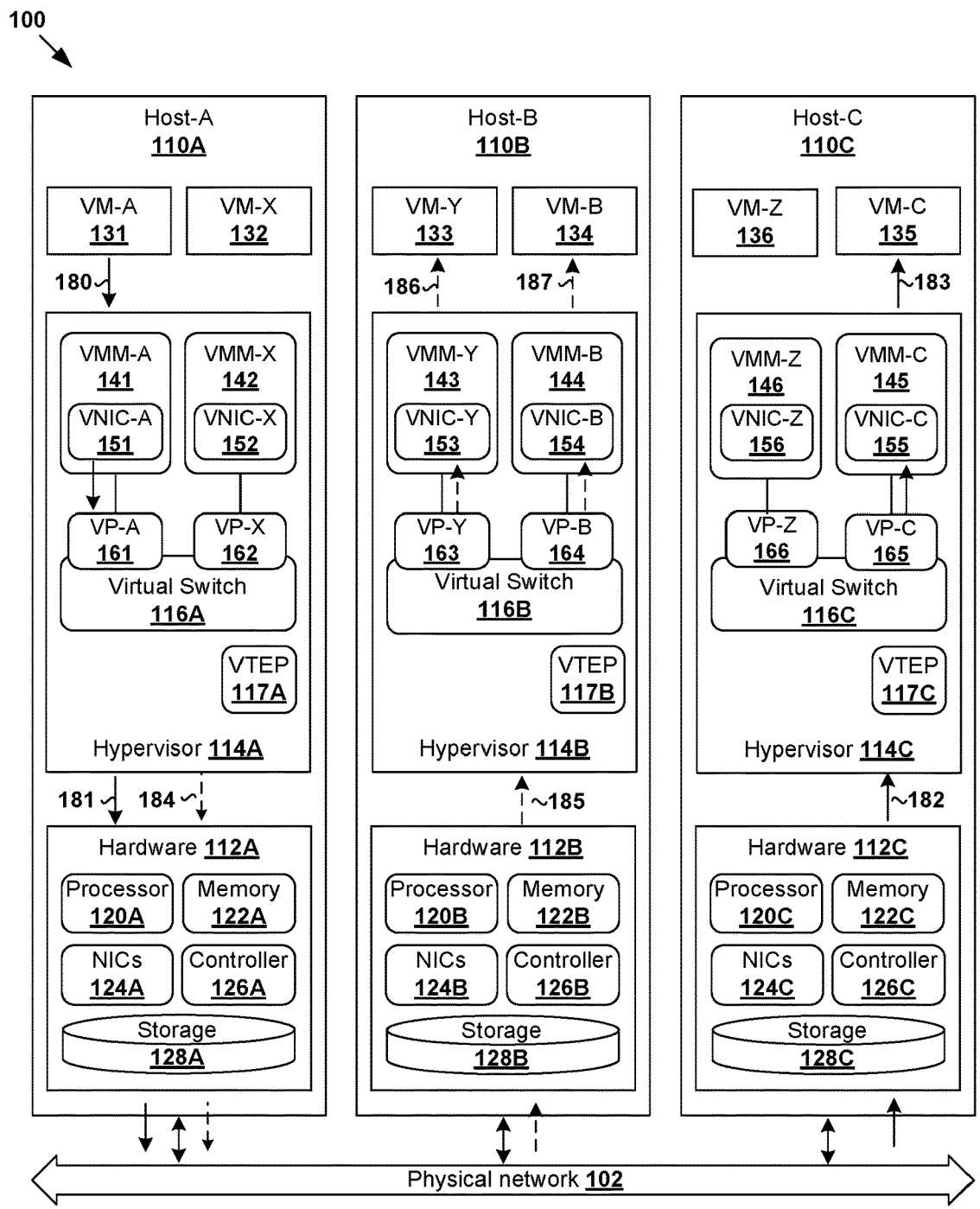
FIG. 1 is a schematic diagram illustrating an example virtualized computing environment in which port mirroring may be implemented.

In the following detailed description, references are made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

In the present disclosure, a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include namespace containers, such as provided by Docker®, (e.g., running on top of a host operating system without the need for a hypervisor or separate operating system such as Docker, etc.; or implemented as an operating system level virtualization), virtual private servers, client computers, etc. The virtual machines may also be complete computational environments, containing virtual equivalents of the hardware and software components of a physical computing system.

FIG. 1 illustrates an example virtualized computing environment 100 in which port mirroring may be implemented, in accordance with at least some embodiments of the present disclosure. It should be understood that, depending on the desired implementation, virtualized computing environment 100 may include additional and/or alternative components than that shown in FIG. 1. In FIG. 1, virtualized computing environment 100 includes multiple hosts, such as host-A 110A, host-B 110B and host-C 110C that are connected via physical network 102. Each host 110A/110B/110C includes suitable hardware 112A/112B/112C and virtualization software (e.g., hypervisor 114A/114B/114C) to support virtual machines. For example, host-A 110A supports virtual machine VM-A 131 and virtual machine VM-X 132; host-B 110B supports virtual machine VM-Y 133 and virtual machine VM-B 134; and host-C 110C supports virtual machine VM-C 135 and virtual machine VM-Z 136. In practice, virtualized computing environment 100 may include any number of hosts (also known as a "computing devices", "host computers", "host devices", "physical servers", "server systems", etc.), where each host may be supporting tens or hundreds of virtual machines.

Hypervisor 114A/114B/114C maintains a mapping between underlying hardware 112A/112B/112C and virtual resources allocated to respective virtual machines 131-135. Hardware 112A/112B/112C includes suitable physical components, such as central processing unit(s) or processor(s) 120A/120B/120C, memory 122A/122B/122C, physical network interface controllers (NICs) 124A/124B/124C, and storage disk(s) 128A/128B/128C accessible via storage controller(s) 126A/126B/126C, etc. To support guest operating systems and applications, virtual resources supported by hardware 112A/112B/112C are allocated to the virtual machines.

For example, corresponding to hardware 112A/112B/112C, the virtual resources may include virtual CPU, virtual memory, virtual disk, virtual network interface controller (VNIC), etc. Hardware resources may be emulated using virtual machine monitors (VMMs). For example, at host-A 110A, VNIC-A 151 and VNIC-X 152 are emulated by respective VMM-A 141 and VMM-X 142. At host-B 110B, VNIC-Y 153 and VNIC-B 154 are emulated by respective VMM-Y 143 and VMM-B 144, while VNIC-C 155 and VNIC-D 156 at host-C 110C are emulated by respective VMM-C 145 and VMM-Z 146. In practice, VMMs 141-145 may be considered as components that are part of respective virtual machines 131-135, or alternatively, separated from virtual machines 131-135. Often, the state of virtual devices is considered to be part of the VM the virtual devices are associated with, and will migrate with the VM if the VM is moved from one host to another, whereas the emulation software for the virtual devices is considered to be part of the hypervisor, as the emulation processes executing on the host CPU are distinct from guest code processes.

Virtual switch 116A/116B/116C are implemented by hypervisor 114A/114B/114C to handle both egress traffic (i.e., outgoing or outbound traffic) from and ingress traffic (i.e., incoming or inbound traffic) to virtual switch 116A/116B/116C. As used herein, the term "packets" may refer generally to a group of bits that can be transported together from a source to a destination, such as segments, frames, messages, datagrams, etc. Also, although the concepts described herein may be used with other networking models, the term "layer 2" may refer generally to a Media Access Control (MAC) layer, and the term "layer 3" to a network or Internet Protocol (IP) layer in the Open System Interconnection (OSI) model. Physical network 102 may include any suitable number of interconnected network devices, such as layer-3 routers, layer-2 switches, gateway devices, etc.

Each virtual switch 116A/116B/116C may generally correspond to a logical collection of virtual ports that are each logically associated with a VNIC. For example in FIG. 1, at host-A 110A, virtual switch 116A is a logical collection of virtual ports VP-A 161 and VP-X 162, which are associated with VNIC-A 151 and VNIC-X 152, respectively. Similarly, at host-B 110B, virtual switch 116B is a logical collection of virtual ports VP-Y 163 and VP-B 164, which are associated with VNIC-Y 153 and VNIC -B 154, respectively. Further, at host-C 110C, virtual switch 116C is a logical collection of virtual ports VP-C 165 and VP-Z 166, which are associated with VNIC-C 155 and VNIC-Z 156, respectively. Each virtual switch 116A/116B/116C maintains forwarding information to forward packets to and from the corresponding VNICs.

In the example communication between VM-A 131 at host-A 110A and VM-C 135 at host-C 110C illustrated in FIG. 1, at host-A 110A, virtual switch 116A receives packets (see 180 in FIG. 1) through VP-A 161 from VM-A 131 and forwards the egress packets (see 181 in FIG. 1) to host-C 110C. At host-C 110C, virtual switch 116C receives the ingress packets (see 182 in FIG. 1) and forwards the egress packets to VP -C 165 and VM-C 135 (see 183 in FIG. 1).

To provide visibility into the communication between VM-A 131 and VM-C 135, a port mirroring session may be configured. In some embodiments, the port mirroring session may be implemented with virtual switch 116A/116B/116C and virtual tunnel endpoint (VTEP) 117A/117B/117C. VTEP 117A/117B/117C are implemented by hypervisor 114A/114B/114C to encapsulate and decapsulate packets transmitted along a tunnel. The term "tunnel" may generally refer to an end-to-end, bi-directional communication path between a pair of VTEPs.

In some embodiments, a network administrator may configure virtual switch 116A and VTEP 117A to perform a port mirroring session between source virtual port VP-A 161 and multiple destination virtual ports VP-Y 163 and VP-B 164. Port mirroring may be performed for purposes such as, without limitation, traffic monitoring, analysis, debugging, network diagnostics, etc Continuing with the example of the port mirroring session between source virtual port VP-A 161 and destination virtual ports VP-Y 163 and VP-B 164, the packets passing through virtual port VP-A 161 of virtual switch 116A are mirrored. Specifically, virtual switch 116A makes a mirrored copy of the ingress packets from VM-A 131 (see 180 in FIG. 1). VTEP 117A is configured to encapsulate the mirrored copy to form encapsulated packets (see 184 in FIG. 1) and sends the encapsulated packets to hypervisor 114B at host-B 110B.

In response to receiving the encapsulated packets (see 185 in FIG. 1), VTEP 117B is configured to decapsulate and retrieve information from the encapsulated packets. Virtual switch 116B may access the retrieved information to make a first copy and a second copy of the mirrored copy and forward the first copy to VP-Y 163 and VM -Y 133 (see 186 in FIG. 1) and the second copy to VP-B 164 and VM-B 134 (see 187 in FIG. 1), respectively. At VM-Y 133 and VM-B 134, any suitable application(s) may be used to analyze the mirrored copy, such as to collect statistics, debug data, diagnose errors, etc.

Figure 2:
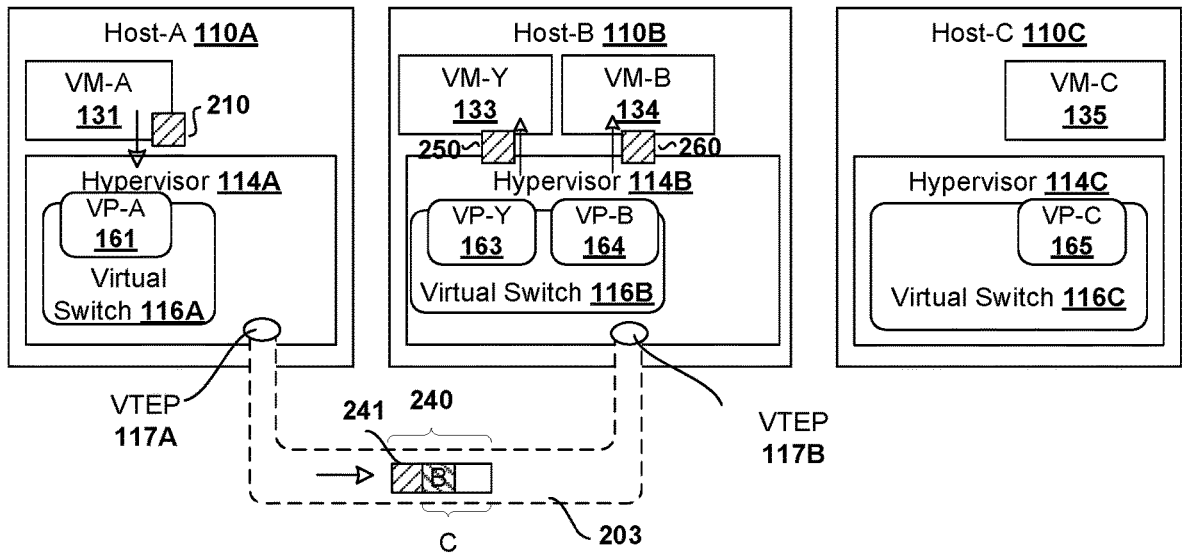
FIG. 2 illustrates an example port mirroring session involving two destination virtual ports and two monitoring VMs.

FIG. 2 illustrates an example port mirroring session involving two destination virtual ports and two monitoring VMs, in accordance with at least some embodiments of the present disclosure. In conjunction with FIG. 1, the traffic between VM-A 131 and VM-C 135 is mirrored, and the mirrored traffic is directed to VP-Y 163 and VP-B, to which VM-Y 133 and VM-B 134 are respectively connected, in the port mirroring session. In some embodiments, the port mirroring session may be implemented by tunnel 203 established between host-A 110A and host-B 110B. In some embodiments, tunnel 203 may be implemented by the Generic Network Virtualization Encapsulation (Geneve) protocol and may be used to encapsulate and forward packets from virtualized computing instances, such as virtual machines. The Geneve protocol is designed to support network virtualization use cases, where tunnels are typically established to act as a backplane between the virtual switches residing in hypervisors, physical switches, or other appliances. The Internet Engineering Task Force (IETF) draft of the Geneve protocol, "Geneve: Generic Network Virtualization Encapsulation draft-ietf-nvo3-geneve-04" (hereinafter the "Geneve IETF Draft"), is incorporated by reference in its entirety.

For the packets being transmitted from VM-A 131 to VM-C 135, in this example port mirroring session, in response to receiving ingress packets (see 210 in FIG. 2) passing through virtual port VP-A 161, virtual switch 116A makes mirrored copies of ingress packets 210, also referred to as mirrored packets 241 in FIG. 2. VTEP 117A is then configured to encapsulate mirrored packets 241 with tunnel header C to generate port mirroring packets 240. In some embodiments, tunnel header C also includes port mirroring options B, which will be further described in subsequent paragraphs. In the port mirroring session, host-A 110A then sends port mirroring packets 240 to host-B 110B via tunnel 203.

At host-B 110B, VTEP 117B is configured to decapsulate and retrieve information from tunnel header C of port mirroring packets 240. Virtual switch 116B may access the information retrieved from tunnel header C. Since this mirroring session involves two monitoring VMs, i.e., VM-Y 133 and VM-B 134, in some embodiments, virtual switch 116B forwards two copies of mirrored packets 241, i.e., 250 and 260, VM-Y 133 and VM-B 134, respectively.

Figure 3A:
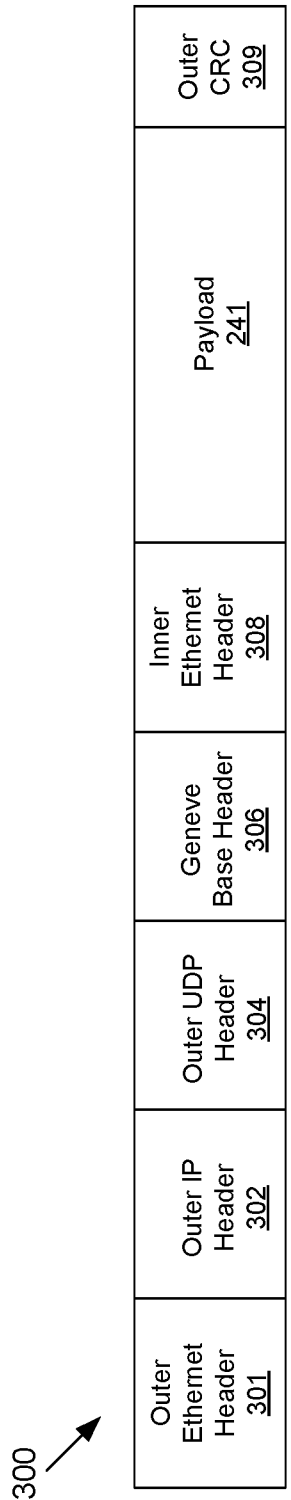
FIG. 3A illustrates an example structure of a Geneve packet.

In conjunction with FIG. 2, FIG. 3A illustrates an example structure of a Geneve packet 300, in accordance with at least some embodiments of the present disclosure. In some embodiments, Geneve packet 300 may correspond to port mirroring packets 240 in FIG. 2. In particular, packet 300 includes outer Ethernet header 301, outer IP header 302, outer UDP header 304, Geneve base header 306, inner Ethernet header 308, payload 241 (corresponding to mirrored packets 241 discussed in conjunction with FIG. 2), and outer CRC 309. In some embodiments, tunnel header C described above and illustrated in FIG. 2 may correspond to Geneve base header 306, and port mirroring options B described above and also illustrated in FIG. 2 may correspond to the options field in Geneve base header 306. Port mirroring options B may also include one or more MAC addresses of the VNICs associated with the monitoring VMs (e.g., VNIC-Y 153 and VNIC-B 154 of FIG. 1).

In some embodiments, Geneve base header 306 that includes port mirroring options (e.g., port mirroring options B) is referred to as a Geneve base mirroring (GBM) header throughout the present disclosure.

Figure 3B:
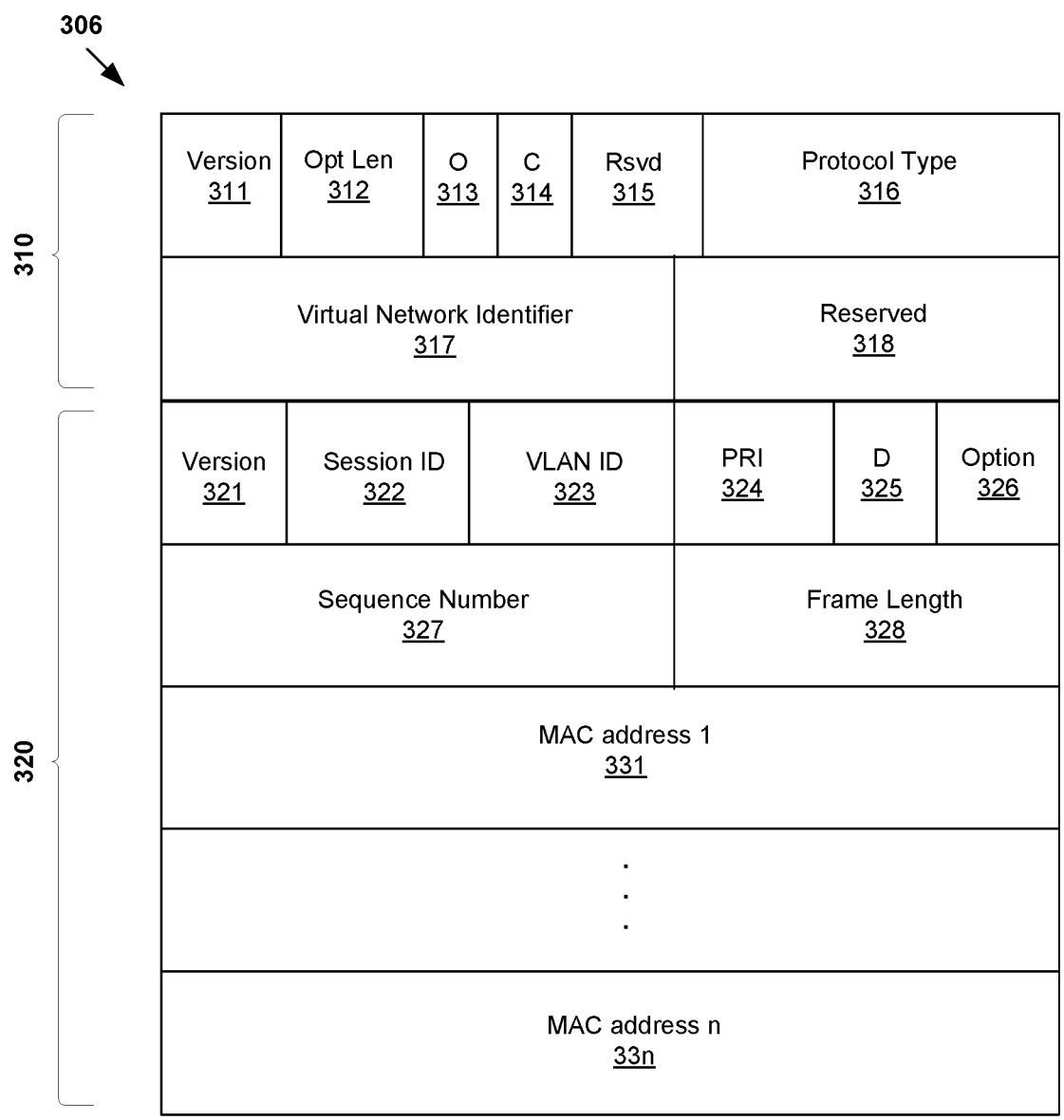
FIG. 3B illustrates an example structure of a Geneve base header.

In conjunction with FIG. 3A, FIG. 3B illustrates an example structure of Geneve base header 306, in accordance with at least some embodiments of the present disclosure. Geneve base header 306 may include some typical fields 310 and port mirroring options 320.

Typical fields 310 may include Version 311, Opt Len 312, O 313, C 314, Rsvd 315, Protocol Type 316, Virtual Network Identifier 317, and Reserved 318. The meaning of any of the essential fields 310 is defined the Geneve IETF Draft. For example, Version 311 refers to a version information of Geneve base header 306. Opt Len 312 refers to the length of variable length options 320. O 313 refers to the OAM packet. C 314 refers to critical options present. Rsvd 315 refers to a reserved field set zero on transmission and ignored on receipt. Protocol type 316 refers to the type of the protocol data unit appearing after Geneve base header 306. Virtual network identifier 317 refers to an identifier for an unique element of a virtual network. Reserved 318 refers to a reserved field set zero on transmission and ignored on receipt In some embodiments, in conjunction with FIG. 2, port mirroring options 320 are placed in the options field of Geneve base header 306 (as defined in the Geneve IETF Draft) and may correspond to port mirroring options B illustrated in FIG. 2. Port mirroring options 320 may include version 321, session ID 322, virtual local area network (VLAN) ID 323, PRI 324, D 325, option 326, sequence number 327, frame length 328, and one or more MAC addresses 331 to 33n of different VNICs, where n is an integer and from 1 to 7.

Using the port mirroring session between virtual port VP-A 161, and virtual ports VP-Y 163 and VP-B 164 illustrated in FIG. 1 and FIG. 2 as an example, in some embodiments, version 321 indicates the version that is supported by the port mirroring session. Session ID 322 is an identifier that uniquely identifies the port mirroring session itself and may be used to distinguish from other sessions. VLAN ID 323 and PRI 324 may be associated with the VLAN information that is tagged to packet 210 of FIG. 2. In some embodiments, VLAN ID 323 may refer to a VLAN identifier tagged to packet 210 of FIG. 2, and PRI 324 may refer to a priority code point tagged to packet 210 of FIG. 2. In some embodiments, the VLAN tagging may be in accordance with IEEE802.1Q.

D 325 indicates the ingress/egress direction of packet 210 with respect to virtual switch 116A. Option 326 indicates the number of VNIC MAC addresses included in port mirroring options 320 of Geneve base header 306.

In conjunction with FIGS. 1 and 2, in some embodiments, a network administrator may set a first MAC address (e.g., MAC address 331) of a first VNIC (e.g., VNIC-Y 153) uniquely associated with a first destination virtual port (e.g., VP-Y 163) and a second MAC address (e.g., MAC address 332) of a second VNIC (e.g., VNIC-B 154) uniquely associated with a second destination virtual port (e.g., VP-B 164) before a port mirroring session begins. VTEP 117A may include MAC address 331 and MAC address 332 in port mirroring options 320. Since each of the MAC addresses is a unique address assigned to each VNIC, even when a VM migrates to another host, the MAC address of the VNIC associated with this particular VM remains unchanged.

Sequence information 327 may refer to an order of a bits transmitted by a batch of packets along tunnel 203. Given that virtualized computing environment 100 of FIG. 1 may not be able to guarantee orders of receiving the batch of packets, the bits may be reassembled again according to sequence information 327.

Frame length 328 may refer to the bit-length of packet 210.

Multiple Destination Virtual Ports on Same Host with GMB Header

Referring back to FIGS. 1 and 2, suppose a network administrator configures a port mirroring session to monitor traffic between VM-A 131 and VM-C 135 and to forward the monitored traffic to the multiple monitor VMs (e.g., VM-Y 133 and VM-B 134) coupled to the multiple destination virtual ports (e.g., VP-Y 163 and VP-B 164). In some embodiments, VTEP 117A may include MAC address of VNIC-Y 153 and MAC address of VNIC-B 154 in port mirroring options 320 shown in FIG. 3.

To obtain the IP address of VTEP 117B associated with host-B 110B, where VNIC-Y 153 and VNIC-B 154 reside, virtual switch 116A may broadcast a message to all hosts in virtualized computing environment 100 to request for the IP address of the VTEP associated with the host that supports VNIC-Y 153 and VNIC-B 154. In some embodiments, Address Resolution Protocol (ARP) is utilized. When host-B 110B supporting VNIC-Y 153 and VNIC-B 154 receives the broadcasted request, host-B 110B may send an IP address associated with host-B 110B (e.g., IP address of VTEP 117B) to virtual switch 116A at host-A 110A. With the IP address of VTEP 117B, VTEP 117A and VTEP 117B may establish the Geneve tunnel 203 between them. In some embodiments, in conjunction with FIG. 3B, a particular field in port mirroring options 320, option 326, may be set to "2," indicating the two MAC addresses for this port mirroring session.

VTEP 117A then sends port mirroring packets 240 to host-B 110B via tunnel 203. At host-B 110B, VTEP 117B decapsulates and retrieves information from packets 240, more specifically from port mirroring options B. Virtual switch 116B may access information retrieved from port mirroring options B. Based on the "2" specified in option 326 and the MAC addresses of VNIC-Y 153 and VNIC-B 154 specified in port mirroring options 320, virtual switch 116B is configured to forward two copies of mirrored packets 241 contained in the payload field of port mirroring packets 240 to VNIC-Y 153 and VM -Y 133 and VNIC-B 154 and VM-B 134.

Multiple Destination Virtual Ports on Different Hosts with GMB Header

Figure 4:
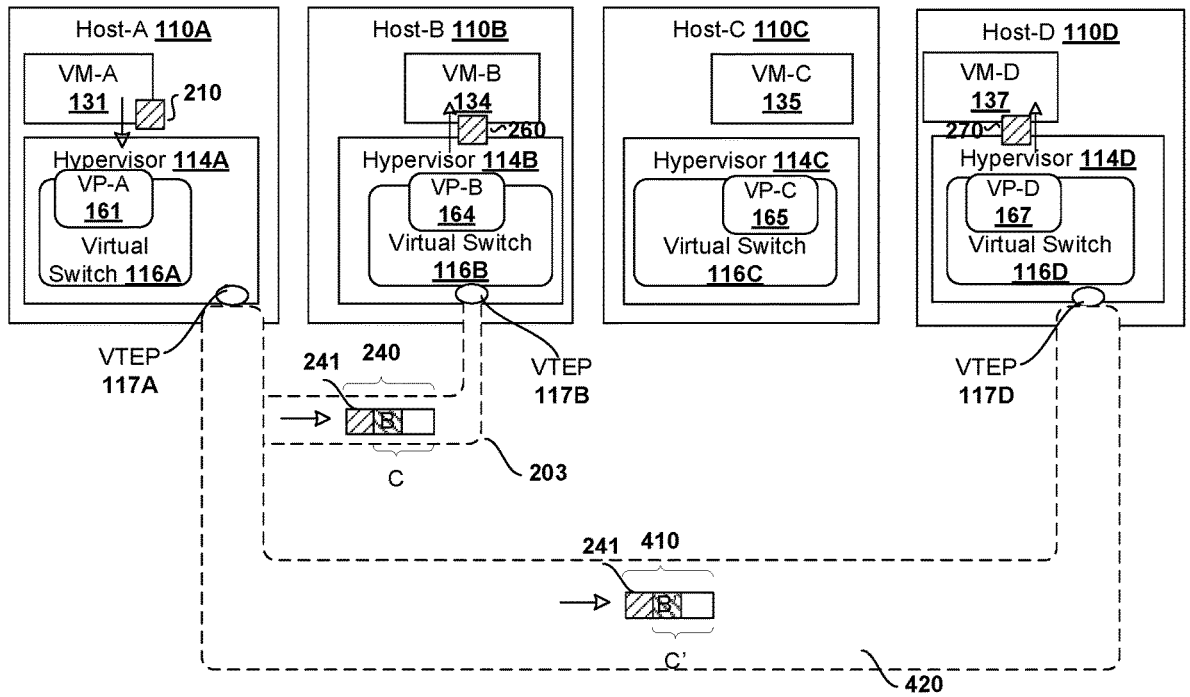
FIG. 4 illustrates an example port mirroring session involving multiple destination virtual ports and multiple monitoring VMs supported on multiple hosts.

FIG. 4 illustrates an example port mirroring session involving multiple destination virtual ports and multiple monitoring VMs supported on multiple hosts, in accordance with at least some embodiments of the present disclosure. Suppose a network administrator configures a port mirroring session to still monitor traffic between VM-A 131 and VM-C 135 but to forward the monitored traffic to destination virtual port VP-B 164 and VM-B 134 on host-B 110B and to destination virtual port VP-D 167 and VM-D 137 on host D 110D.

Virtual switch 116A may similarly use ARP to obtain the IP address associated with host-B 110B where VM-B 134 resides and the IP address associated with host-D 110D where VM-D 137 resides. With the IP address of VTEP 117B, VTEP 117A and VTEP 117B may establish a first Geneve tunnel 203 between them. With the IP address of VTEP 117D, VTEP 117A and VTEP 117D may establish a second Geneve tunnel 420 between them.

VTEP 117A then sends port mirroring packets 240 to host-B 110B via tunnel 203 and port mirroring packets 410 to host-D 110D via tunnel 420. In other words, because virtual switch 116A obtains two different IP addresses corresponding to VTEP 117B and VTEP 117D, in some embodiments, two sets of port mirroring packets are generated and sent.

In some embodiments, the payload field of port mirroring packets 240 and port mirroring packets 410 may contain the same mirrored packets 241. Also, option 326 in the GBM header of port mirroring packets 240 and port mirroring packets 410 may both be set to "1," indicating a single MAC address and a single monitoring VM to forward mirrored traffic to. However, tunnel header C' of port mirroring packets 410 may be different from tunnel header C of port mirroring packets 240. For example, port mirroring options B' includes the MAC address associated with VM-D 137 while port mirroring options B includes the MAC address associated VM-B 134.

At host-B 110B, VTEP 117B decapsulates and retrieves information from port mirroring packets 240, more specifically from port mirroring options B. Virtual switch 116B may access information retrieved from port mirroring options B. Based on the "1" specified in option 326 and the MAC address associated with VM-B 134, virtual switch 116B is configured to forward a single copy of mirrored packets 241 (i.e., 260) to VM-B 134. Similarly, based on the "1" specified in option 326 and the MAC address associated with VM-D 137, virtual switch 116D is configured to also forward a single copy of mirrored packet 241 (i.e., 270) to VM-D 137.

Figure 5:
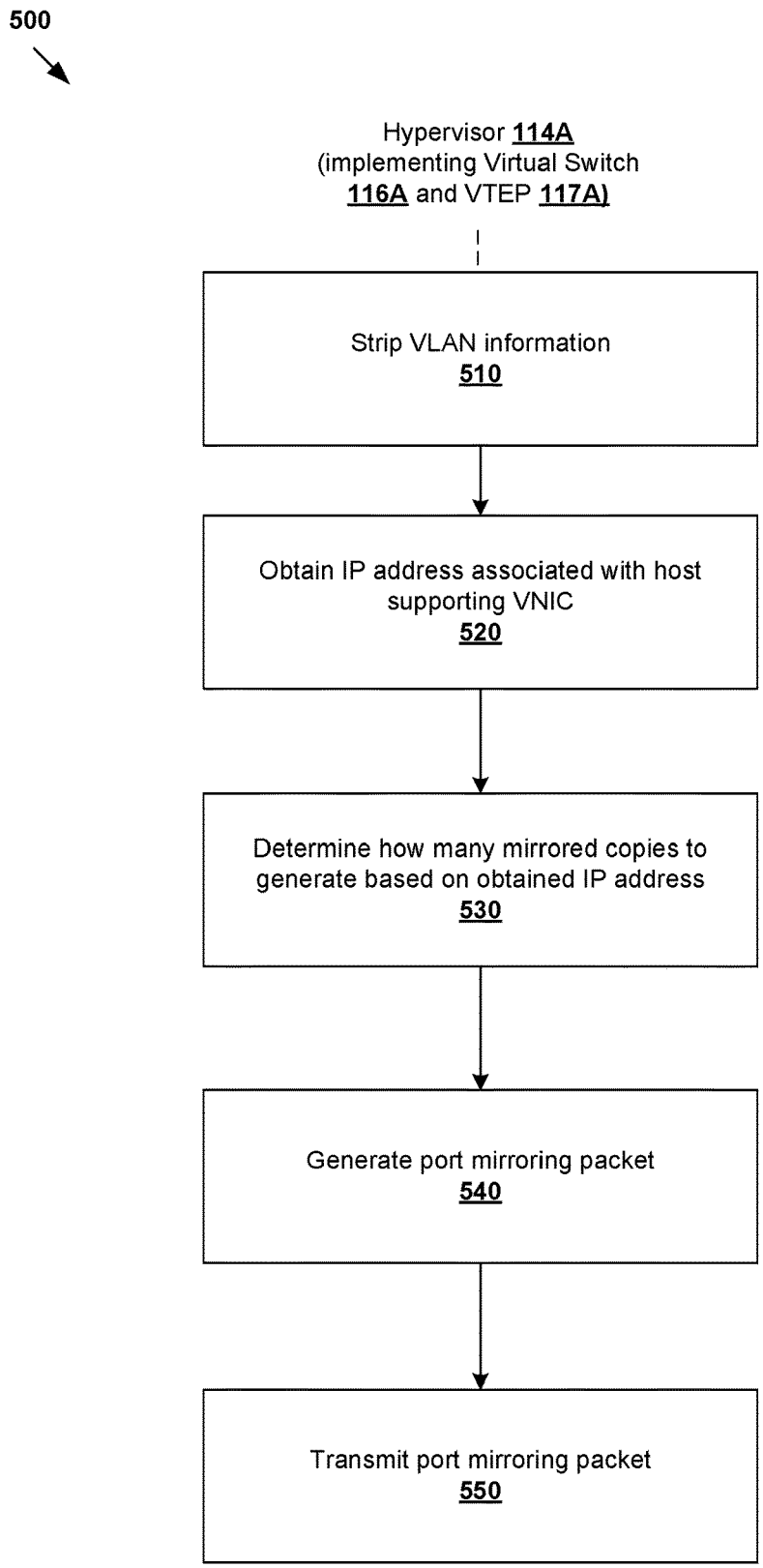
FIG. 5 is a flowchart of an example process for a source hypervisor to implement a port mirroring session between a source virtual port and one or more destination virtual ports.

FIG. 5 is a flowchart of an example process 500 for a source hypervisor (e.g., hypervisor 114A implementing virtual switch 116A and VTEP 117A) to implement a port mirroring session between a source virtual port (e.g., virtual port VP-A 161) and one or more destination virtual ports (e.g., virtual ports VP-Y 163, VP-B 164, and VP-D167), in accordance with at least some embodiments of the present disclosure. Example process 500 may include one or more operations, functions, or actions illustrated by one or more blocks, such as 510 to 550. The various blocks may be combined into fewer blocks, divided into additional blocks, and/or eliminated depending on the desired implementation.

At 510 in FIG. 5, in conjunction with FIG. 2, hypervisor 114A may strip the VLAN information that is tagged to packets 210. As mentioned earlier, the VLAN information that is stripped may include, without limitation, tag protocol identifier, priority code point, drop eligible indicator, and VLAN identifier.

At 520 in FIG. 5, hypervisor 114A may obtain one or more IP addresses (e.g., IP address of VTEP 117B) associated with one or more hosts supporting one or more VNICs associated with destination virtual ports (e.g., VP-Y 163, VP-B 164, and/or VP-D 167). In some embodiments, ARP is utilized to obtain the IP addresses.

At 530 in FIG. 5, based on the number of IP addresses obtained at 520, hypervisor 114A may determine how many copies of port mirroring packets to generate in the port mirroring session. For instance, in response to the destination virtual ports residing on a single host, hypervisor 114A may determine to generate one copy of port mirroring packets. In response to the destination virtual ports residing on different hosts, hypervisor 114 may determine to generate multiple copies of port mirroring packets. In some embodiments, the number of copies equals to the number of distinct IP addresses obtained at 520.

At 540 in FIG. 5, hypervisor 114A may generate the port mirroring packets by encapsulating packets 210 (with the VLAN information stripped) with a GBM header. In some embodiments, the GBM header may have the structure illustrated in FIG. 3B. In addition to the GBM header, hypervisor 114A may also encapsulate other headers (e.g., headers 301, 302, and 304 illustrated in FIG. 3A). Based on the number determined at block 530, hypervisor 114A may make copies of the port mirroring packets.

At 550 in FIG. 5, virtual switch 116A is configured to transmit the port mirroring packets from the source host (e.g., host-A 110A) to one or more destination host (e.g., host-B 110B and/or host-D 110D) in a port mirroring session. In some embodiments, the port mirroring packets may be transmitted along a tunnel between a source VTEP (e.g., VTEP 117A) on the source host and one or more destination VTEPs (e.g., VTEP 117B and/or VTEP 117D) on the destination hosts.

Figure 6:
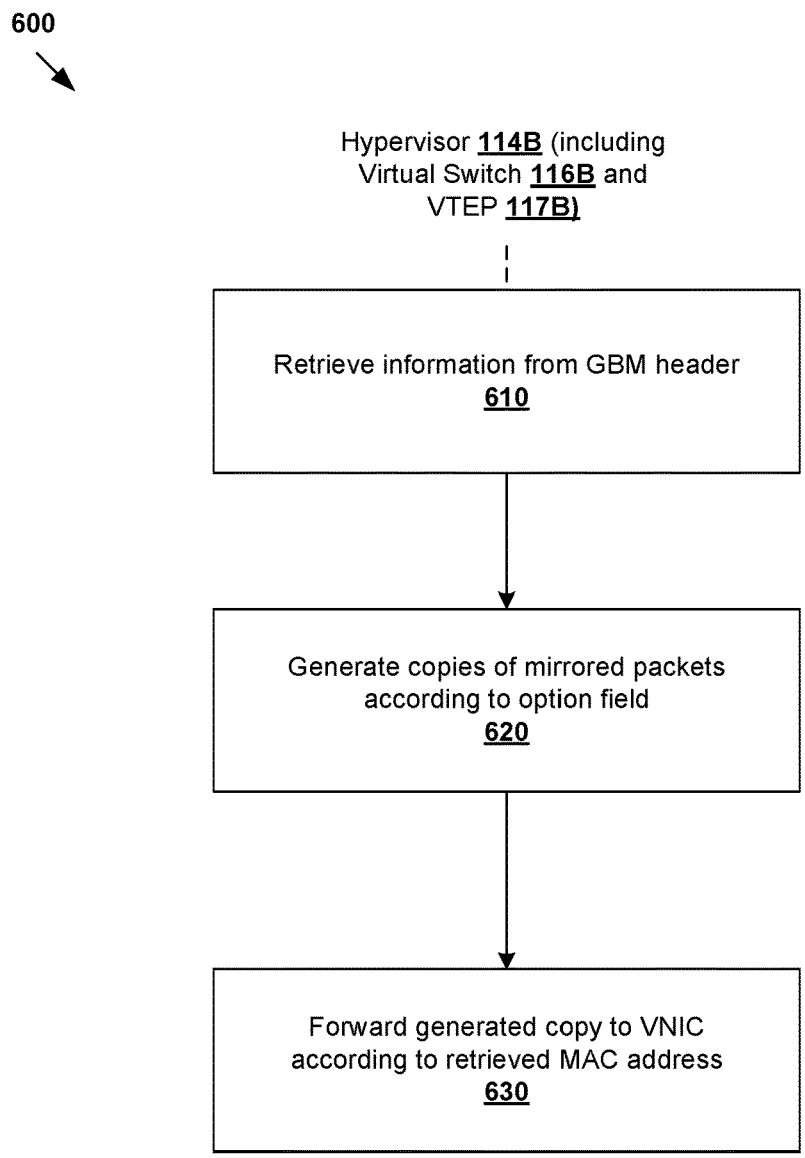
FIG. 6 is a flowchart of an example process for a destination hypervisor to implement a port mirroring session between a source virtual port and one or more destination virtual ports, all arranged in accordance with at least some embodiments of the present disclosure.

FIG. 6 is a flowchart of an example process 600 for a destination hypervisor (e.g., hypervisor 114B implementing virtual switch 116B and VTEP 117B) to implement a port mirroring session between a source virtual port (e.g., virtual port VP-A 161) and one or more destination virtual ports (e.g., virtual ports VP-Y 163, VP-B 164, VP-D 167), in accordance with at least some embodiments of the present disclosure.

At 610 in FIG. 6, hypervisor 114B may decapsulate the port mirroring packets received from host-A 110A to retrieve information from the GBM header and the payload data of the port mirroring packet. For example, in conjunction with FIG. 3B, based on the number of MAC addresses indicated in option 326, hypervisor 114B may retrieve a predetermined number of bits from MAC address fields 331 to 33n. Suppose option 326 indicates that one MAC address is included in the GBM header. Hypervisor 114B may retrieve the first 48 bits from MAC address field 331. On the other hand, suppose option 326 indicates that two MAC addresses are included in the GBM header. Hypervisor 114B may retrieve the first 96 bits from MAC address field 331 and MAC address field 332.

At 620 in FIG. 6, according to the number specified in option 326 of FIG. 3B in the GBM header, hypervisor 114B may generate copies of the decapsulated port mirroring packets, or the mirrored packets (e.g., 241 of FIG. 2). The number of copies to be generated may be equal to the number of MAC addresses specified in the GBM header.

At 630 in FIG. 6, hypervisor 114B may forward the number of copies of the mirrored packets to the VNICs and the monitoring VMs according to the MAC addresses retrieved at 610.

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8B. For example, a computer system capable of acting as host 110A/110B/110C may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a hypervisor supported by a source host to implement a port mirroring session in a virtualized computing environment, wherein the method comprises:

receiving a packet passing through a first virtual port supported by the source host, wherein the packet is destined for a destination virtual machine on a destination host;

based on a first media access control (MAC) address of a first virtual network interface controller (VNIC) associated with a first monitoring virtual machine (VM), obtaining a first IP address associated with a first host that supports the first VNIC and the first monitoring VM;

generating a port mirroring packet with the first IP address and a mirrored copy of the packet, wherein the port mirroring packet comprises a first encapsulation base header, which includes the first MAC address; and transmitting the port mirroring packet to the first host.

2. The method of claim 1, further comprises stripping VLAN information from the packet, wherein the VLAN information includes one or more of tag protocol identifier, priority code point, drop eligible indicator, and VLAN identifier.

3. The method of claim 1, further comprising:

based on a second MAC address of a second VNIC associated with a second monitoring VM, obtaining a second IP address associated with a second host that supports the second VNIC and the second monitoring VM;

generating another port mirroring packet with the second IP address and the mirrored copy of the packet, wherein the another port mirroring packet comprises a second encapsulation base header, which includes the second MAC address; and transmitting the another port mirroring packet to the second host.

4. The method of claim 1, further comprising:

when the port mirroring session is configured to include a second monitoring VM, and a second MAC address of a second VNIC associated with the second monitoring VM is supported by the first host, including the second MAC address in the first encapsulation base header before transmitting the port mirroring packet to the first host.

5. The method of claim 1, further comprising including a number in the first encapsulation base header, which corresponds to a number of MAC addresses that are included in the first encapsulation base header.

6. The method of claim 1, wherein the first encapsulation base header further comprises an identifier to uniquely identify the port mirroring session.

7. The method of claim 1, wherein the first encapsulation base header further comprises ingress or egress traffic information of the packet passing through the first virtual switch with respect to the first virtual switch.

8. The method of claim 1, wherein the obtaining the first IP address comprises:
broadcasting a request in the virtualized computing environment for an IP address of a virtual tunnel endpoint at a host that supports the first VNIC and the first monitoring VM; and
receiving the IP address of the virtual tunnel endpoint from a response message.

9. A non-transitory computer-readable storage medium that includes a set of instructions which, in response to execution by a processor of a source host, causes the processor to implement a method for a hypervisor supported by the source host to implement a port mirroring session in a virtualized computing environment, wherein the method comprises:
receiving a packet passing through a first virtual port supported by the source host, wherein the packet is destined for a destination virtual machine on a destination host;
based on a first media access control (MAC) address of a first virtual network interface controller (VNIC) associated with a first monitoring virtual machine (VM), obtaining a first IP address associated with a first host that supports the first VNIC and the first monitoring VM;
generating a port mirroring packet with the first IP address and a mirrored copy of the packet, wherein the port mirroring packet comprises a first encapsulation base header, which includes the first MAC address; and
transmitting the port mirroring packet to the first host.

10. The non-transitory computer-readable storage medium of claim 9, wherein the method further comprises stripping VLAN information from the packet, and the VLAN information includes one or more of tag protocol identifier, priority code point, drop eligible indicator, and VLAN identifier.

11. The non-transitory computer-readable storage medium of claim 9, wherein the method further comprising:
based on a second MAC address of a second VNIC associated with a second monitoring VM, obtaining a second IP address associated with a second host that supports the second VNIC and the second monitoring VM;
generating another port mirroring packet with the second IP address and the mirrored copy of the packet, wherein the another port mirroring packet comprises a second encapsulation base header, which includes the second MAC address; and
transmitting the another port mirroring packet to the second host.

12. The non-transitory computer-readable storage medium of claim 9, wherein the method further comprising:
when the port mirroring session is configured to include a second monitoring VM, and a second MAC address of a second VNIC associated with the second monitoring VM is supported by the first host, including the second MAC address in the first encapsulation base header before transmitting the port mirroring packet to the first host.

13. The non-transitory computer-readable storage medium of claim 12, wherein the method further comprising including a number in the first encapsulation base header, which corresponds to a number of MAC addresses that are included in the first encapsulation base header.

14. The non-transitory computer-readable storage medium of claim 9, wherein the first encapsulation base header further comprises an identifier to uniquely identify the port mirroring session.

15. The non-transitory computer-readable storage medium of claim 9, wherein the obtaining the first IP address comprises:
broadcasting a request in the virtualized computing environment for an IP address of a virtual tunnel endpoint at a host that supports the first VNIC and the first monitoring VM; and
receiving the IP address of the virtual tunnel endpoint from a response message.

16. A computer system configured to implement a port mirroring session in a virtualized computing environment, and the computer system comprises:
a processor; and
a non-transitory computer-readable medium having stored thereon instructions that, in response to execution by the processor, cause the processor to:
receive a packet passing through a first virtual port supported by the computer system, wherein the packet is destined for a destination virtual machine on a destination host;
based on a first media access control (MAC) address of a first virtual network interface controller (VNIC) associated with a first monitoring virtual machine (VM), obtain a first IP address associated with a first host that supports the first VNIC and the first monitoring VM;
generate a port mirroring packet with the first IP address and a mirrored copy of the packet, wherein the port mirroring packet comprises a first encapsulation base header, which includes the first MAC address; and
transmit the port mirroring packet to the first host.

17. The computer system of claim 16, wherein the non-transitory computer-readable medium having stored thereon additional instructions that, in response to execution by the processor, cause the processor to strip VLAN information from the packet, wherein the VLAN information includes one or more of tag protocol identifier, priority code point, drop eligible indicator, and VLAN identifier.

18. The computer system of claim 16, wherein the non-transitory computer-readable medium having stored thereon additional instructions that, in response to execution by the processor, cause the processor to:
based on a second MAC address of a second VNIC associated with a second monitoring VM, obtain a second IP address associated with a second host that supports the second VNIC and the second monitoring VM;
generate another port mirroring packet with the second IP address and the mirrored copy of the packet, wherein the another port mirroring packet comprises a second encapsulation base header, which includes the second MAC address; and
transmit the another port mirroring packet to the second host.

19. The computer system of claim 16, wherein the non-transitory computer-readable medium having stored thereon additional instructions that, in response to execution by the processor, cause the processor to:
  when the port mirroring session is configured to include a second monitoring VM, and a second MAC address of a second VNIC associated with the second monitoring VM is supported by the first host, include the second MAC address in the first encapsulation base header before transmitting the port mirroring packet to the first host.

20. The computer system of claim 19, wherein the non-transitory computer-readable medium having stored thereon additional instructions that, in response to execution by the processor, cause the processor to include a number in the first encapsulation base header, which corresponds to a number of MAC addresses that are included in the first encapsulation base header.

* * * * *